Jan. 9, 1968 R. H. LANGDON ET AL 3,362,043
APPARATUS FOR MAKING PLASTIC ARTICLES
Filed Dec. 9, 1964 3 Sheets-Sheet 3

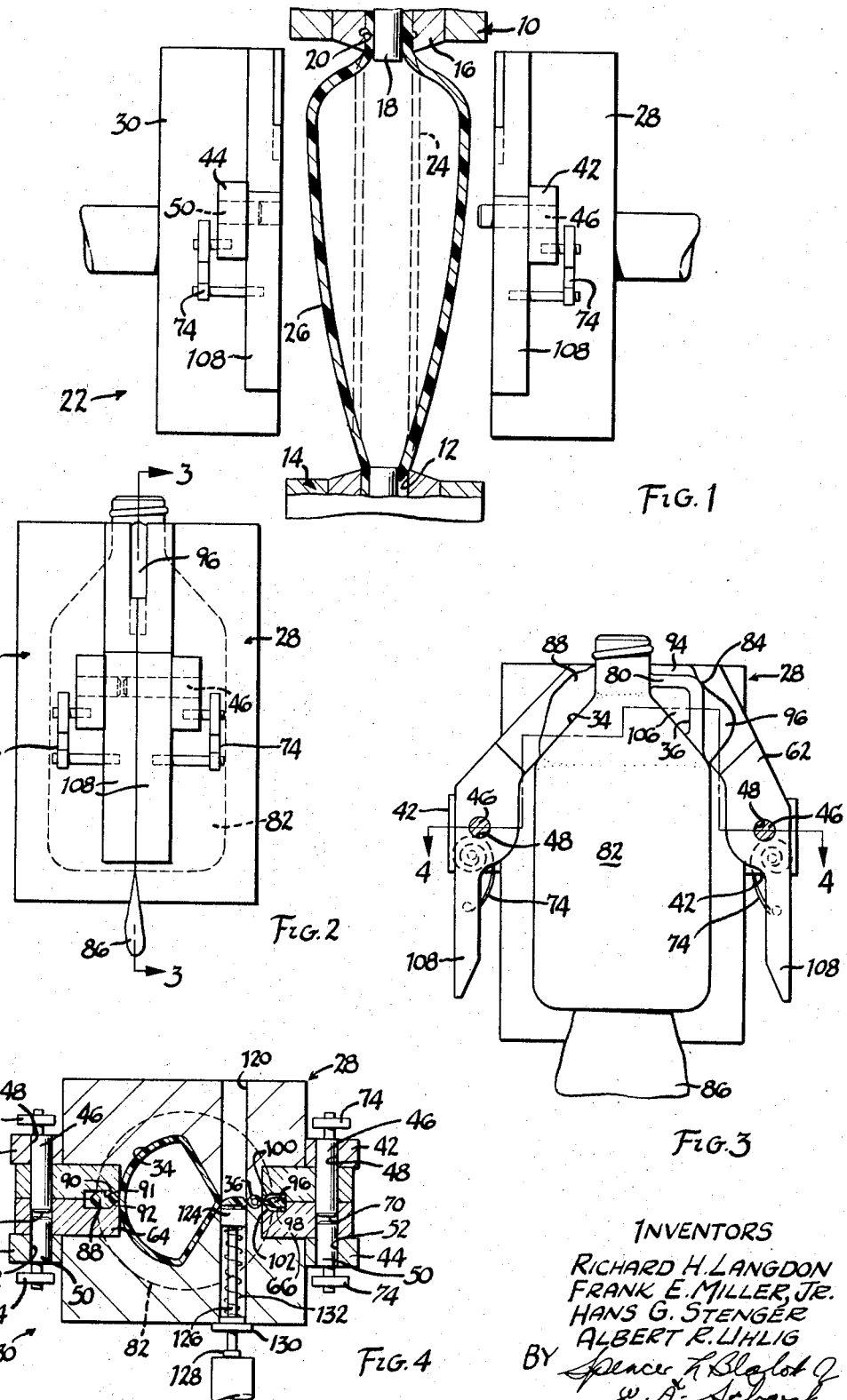

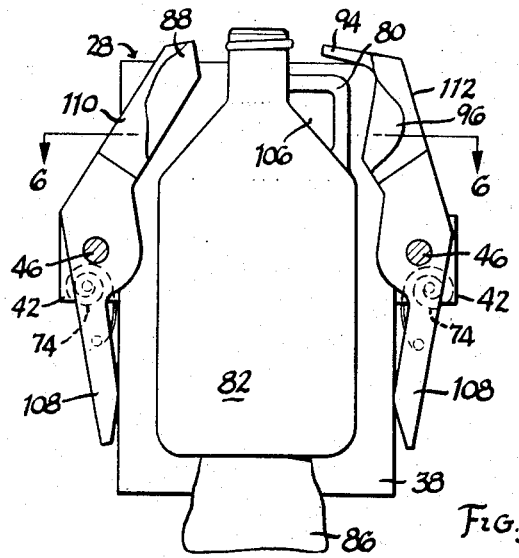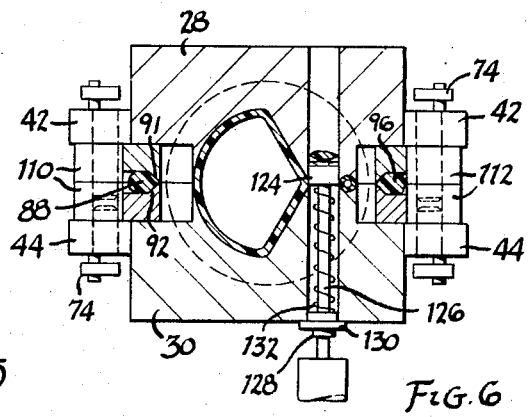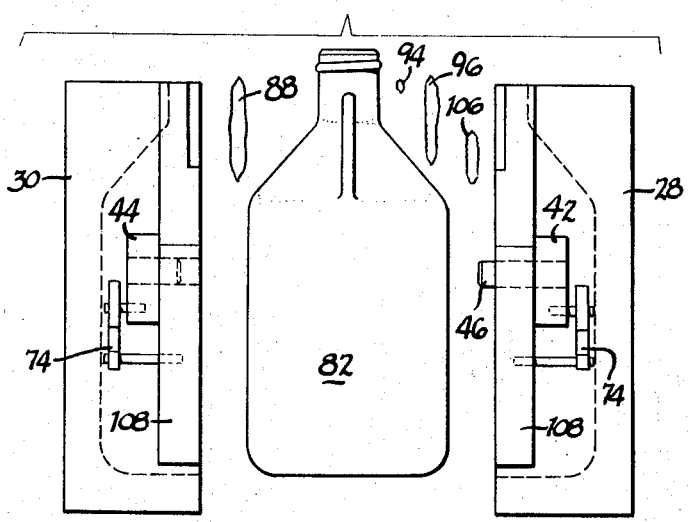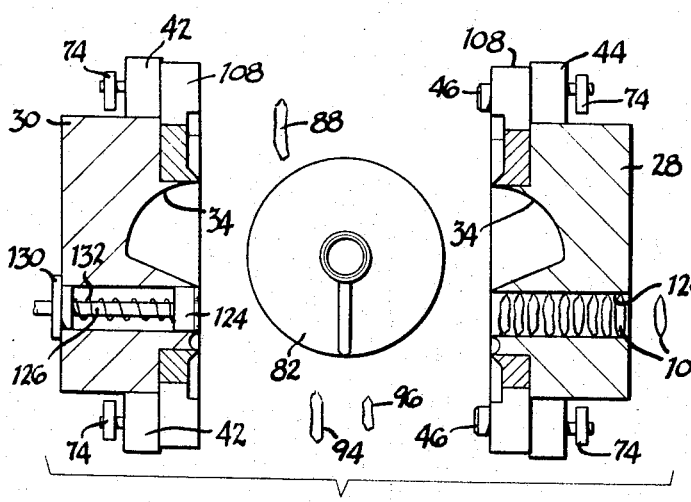

INVENTORS
RICHARD H. LANGDON
FRANK E. MILLER, JR.
HANS G. STENGER
ALBERT R. UHLIG
ATTORNEYS

United States Patent Office 3,362,043
Patented Jan. 9, 1968

3,362,043
APPARATUS FOR MAKING PLASTIC ARTICLES
Richard H. Langdon, Toledo, Ohio, Frank E. Miller, Jr., Charlotte, N.C., Hans G. Stenger, Warren Township, Plainfield, N.J., and Albert Rudolf Uhlig, Toledo, Ohio, assignors to Owens-Illinois, Inc., a corporation of Ohio
Filed Dec. 9, 1964, Ser. No. 417,047
2 Claims. (Cl. 18—5)

ABSTRACT OF THE DISCLOSURE

A mold apparatus for making plastic articles having cooperable mold sections with levers at the parting line and movable on a common pivot point which levers are arranged to receive and remove the flash waste from the article while the article remains confined within the mold.

The present invention relates to an improved apparatus for making plastic articles and more particularly an apparatus for removing flash from molded plastic articles while each article remains confined within the mold.

In the past, it has been commercially accepted practice, in conjunction with certain molding techniques, to mold plastic articles, including bottles and jugs with integral handles, by closing mold sections upon plasticized plastic material so as to essentially divide the plastic material into article forming plastic material and "flash" or waste plastic material integrally held together by a thin web or hot line of plastic material passing between the mold sections. Following formation of the article into its finished configuration, the mold sections are opened and the article is removed. Subsequently, the integral flash is cut from the surface of the article by an expensive process utilizing complex cutting equipment or hand labor at a point in time when the temperature of both the flash waste and the article are below the plasticizing range. Consequently, the cutting of the flash from the article is extremely difficult and costly, since the plastic material is no longer in a plasticized state.

The present invention provides a novel, advantageous improvement over the prior art for removing flash from the surface of the finished article or containers during the molding operation, while the article or container is retained between separable mold sections.

Specifically, the present invention provides an apparatus whereby flash plastic material joining the blow molded portion of the article or container is disconnected from the article prior to removal of the article from the molding apparatus by utilizing separable mold sections having segments which define flash receiving recesses or depositories. The flash, when confined to the recesses or depositories, is normally integral with the article-forming plastic material along a thin web, thereby forming a hot line at the interface of the web and the flash, by reason of a more rapid heat transfer rate to the mold sections at the thin web. The segments may be levers normally biased into the article-forming orientation and arcuately displaceable relative to the main part of the mold sections to progressively tear or sever the flash from the surface of the article along the hot line at a preselected time during the molding operation while the molded article remains confined within the mold sections. Thereafter, the severed flash is discarded when the mold sections are opened and the article is removed.

Accordingly, it is a primary object of the present invention to provide an improved system, including apparatus, for making molded plastic articles such as, by way of example only, blow molded containers formed from an extruded tube of heat-softened plastic material.

Another important object of this invention is the provision of the improved apparatus for removing flash from a fabricated plastic article, where the production of flash is reasonably necessary to the proper formation of a given article, container or the like, while the article is retained within separable molding sections and while the flash plastic material is still somewhat heat-softened, thereby obviating any requirement for subsequently severing the flash material from the article following removal of the article from the molding apparatus.

It is a further object to provide an improved apparatus for making plastic articles utilizing a novel technique of progressively severing flash material from the article, where the production of flash is reasonably necessary to the proper formation of a given article, container or the like, while the flash material is still relatively heat softened and while the article remains confined within the molding structure.

Other objects and features of this invention will become apparent from the following description and appended claims in conjunction with the accompanying drawings, wherein:

FIGURE 1 is an enlarged fragmentary sectional view of a portion of one preferred embodiment of the present invention illustrating an injection mold, separable blow mold sections equipped with structure for receiving and severing flash plastic material during the molding operation and for forming a bottle or jug with an integral handle, and an extruded partially expanded length of tubing integral with and intermediate of the material filling an extrusion orifice and with the material filling the injection mold;

FIGURE 2 is a side elevational view of the apparatus of FIGURE 1 with the separable blow mold sections closed and the tubing fully expanded by blowing to form the finished bottle configuration;

FIGURE 3 is a sectional view taken along line 3—3 of FIGURE 2 with one of the mold sections removed to thereby illustrate the structure for receiving and severing the flash plastic material in its article-forming position during molding operations;

FIGURE 4 is a cross sectional view taken along line 4—4 of FIGURE 3;

FIGURE 5 is a sectional view similar to FIGURE 3 illustrating the position of the structure for receiving and severing flash plastic material following the disconnection of the flash material from the fabricated plastic article while still in the mold sections;

FIGURE 6 is a cross sectional view taken along line 6—6 of FIGURE 5;

FIGURE 7 is a side elevational view similar to FIGURE 2 but illustrating the mold sections in their open position for discarding the severed flash segments and for accommodating removal of the finished bottle;

FIGURE 8 is a cross sectional view taken along line 8—8 of FIGURE 7;

Figure 9:
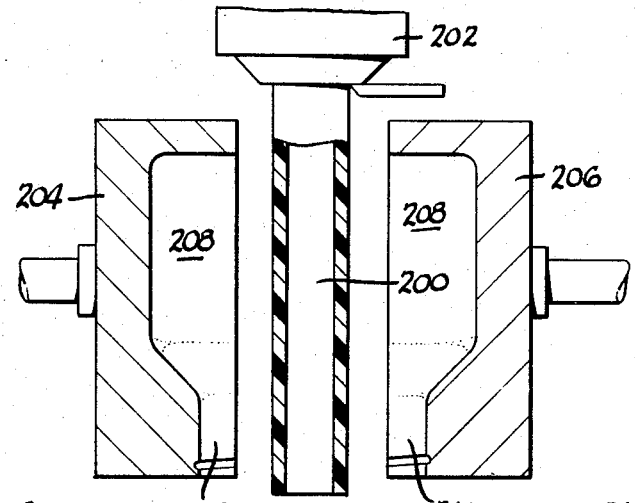
Figures 10, 11:
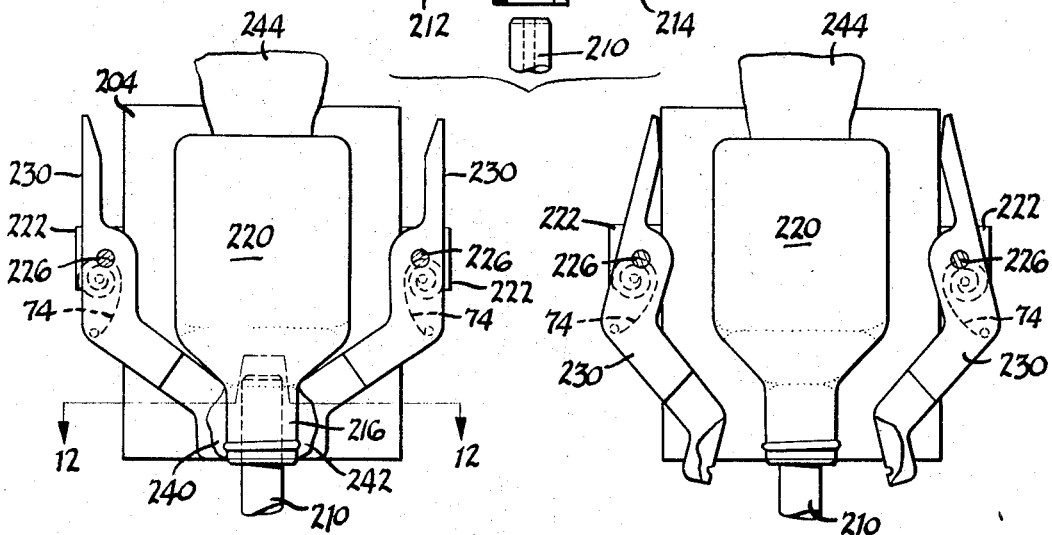

FIGURE 9 is a frgamentary sectional view in elevation of a portion of another presently preferred embodiment of this invention illustrating separable blow mold sections carrying a sectionalized compression mold for forming a neck and mouth for the bottle and equipped with structure adjacent the compression mold for receiving and severing flash plastic material during molding operations and an extruded length of tubing integral with the material filling an extrusion orifice;

FIGURE 10 is a sectional view in elevation of the apparatus of FIGURE 9 with one of the mold sections removed to illustrate the structure for receiving and severing the flash adjacent the neck and mouth of the illustrated molded container in its article forming position during the molding operation;

FIGURE 11 is a sectional view similar to FIGURE 10 but with the lever arms actuated into the flash severing position; and

Figure 12:
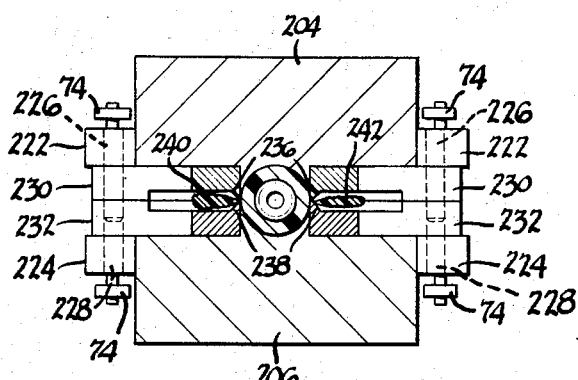

FIGURE 12 is a cross sectional view taken along line 12—12 of FIGURE 10.

For reasons of economy and mass production, the proper formation through molding of a given plastic article often necessitates the production of flash, i.e., excess plastic material present at selected positions within the main mold cavity or immediately adjacent thereto which must be either forced outside the main mold cavity or essentially isolated therefrom and thereafter severed from the finished molded plastic article.

Formerly, the severing of the flash required a so-called secondary trimming operation including utilization of special trimming equipment following the molding operation at a time when the plastic article and the integrally attached flash were no longer in a heat softened state.

The present invention provides an apparatus for trimming the flash during the molding operation and is depicted by two embodiments, namely, the embodiments of FIGURES 1 through 8, inclusive, and FIGURES 9 through 12, inclusive. It is to be appreciated that these two embodiments and the description relative thereto is presented by way of illustration only and not by way of restriction.

The embodiment of FIGURES 1 through 8

Referring now in detail to the drawings and specifically to the embodiments illustrated in FIGURES 1 through 8, inclusive, wherein like numerals are used to denominate like parts throughout, equipment for blow molding a large diameter jug or bottle having an integral handle from a heat softened extruded tube length of tubing is illustrated.

The apparatus of FIGURE 1 may be part of the basic machine described in United States Letters Patent 3,008,-192, assigned to the assignee of the present invention, and to which reference may be made if desired.

Sequential operations leading to the manufacture of a large diameter bottle with an integral handle by utilization of the apparatus illustrated in FIGURES 1 through 8, inclusive, is commenced by positioning an injection mold 10 contiguously adjacent orifice 12 of extruder 14. A predetermined volume of heat-softened plastic material is injection molded through extruder 14 into injection mold 10 between outer annular member 16 which defines the exterior of an injection mold cavity and injection mold core 18 which forms the interior of the injection mold cavity. Injection mold core 18 has a hollow passage which conventionally serves as a blow mold nozzle for purposes to be subsequently explained. The injection mold apparatus and the extruder apparatus form no part of this invention as they are well known pieces of equipment.

Introduction of heat softened plastic material into injection mold 10, in this instance, forms the neck and mouth of the bottle including exterior threads for receiving a closure. Injection mold 10 is normally actuated by a double-acting cylinder (not shown) operable in timed relation to the remaining components of the illustrated apparatus.

Following formation of the mouth and neck of the bottle in injection mold 10, a tube integral with neck 20 is extruded through orifice 12 of extruder 14 as injection mold 10 is progressively moved away from orifice 12.

When injection mold 10 has reached an appropriate position beyond the travel path of separable blow mold 22, and when a predetermined length of tubing has been extruded from orifice 12, the movement of injection mold 10 and the delivery of heat softened plastic material through orifice 12 cease.

A prescribed quantity of air or like fluid under pressure issues through the nozzle of core 18 for a preselected period of time at a desired pressure to "puff" or partially expand the tube into pear-shaped configuration 26. This procedure is essential, for reasons of economy and mass production, in order to provide sufficient lateral dimension for formation of an integral handle on the bottle occasioned by the closing of blow mold sections 28 and 30 of separable blow mold 22. This "puffing" technique is more particularly described in United States Letters Patent No. 3,012,286, assigned to the assignee of the present invention.

Once the extruded tube has assumed the pear-shaped configuration 26, as depicted in FIGURE 1, blow mold sections 28 and 30, normally responsive to energization of respective cylinder assemblies (not shown), are moved toward and into surface-to-surface engagement with each other thereby forming integral bottle handle 80 in handle cavity 36 and flash material adjacent thereto. Thereafter, an additional quantity of air or like fluid under pressure is introduced into the extruded tube through the nozzle of core 18 causing the tube to expand and completely fill and conform to the main mold cavity 34 formed by mold sections 28 and 30, as depicted in FIGURES 2 through 4, inclusive.

Integrally attached to mold sections 28 and 30 along each side thereof in a centralized vertical location are apertured support blocks 42 and 44, respectively. Each support block 42 non-rotatably carries elongated pin 46 in aperture 48, while each support block 44 non-rotatably carrys a somewhat shorter pin 50 in aperture 52.

Left and right hand levers 60 and 62, respectively, are pivotably mounted upon their associated pin 46 carried by support block 42, while left and right hand levers 64 and 66, respectively, are pivotably mounted upon their associated pin 50. By inspection of FIGURE 4, it should be noted that pins 46 are of sufficient length so that the distal ends thereof extend through the mounting aperture of levers 60 and 62 and into mounting apertures 68 and 70, respectively, of left and right hand levers 64 and 66 when mold sections 28 and 30 are in their closed position. The distal ends of pins 46 freely separate from mounting apertures 68 and 70 of levers 64 and 66 upon opening mold sections 28 and 30. It will therefore be noted that pins 46 and 50 provide a common pivot point for the levers.

Following partial expansion of tube 24 into the pear-shaped configuration 26, illustrated in FIGURE 1, blow mold sections 28 and 30 are closed into surface-to-surface contiguous relation upon the heat softened plastic of pear-shaped configuration 26, with levers 60, 62, 64 and 66 biased to the article forming position, illustrated in FIGURES 2 through 4, by biasing torsion spring 74 wrapped about pins 46, 50 or by equivalent means. The lateral dimension of pear-shaped configuration 26 is controlled so as to be slightly greater than twice the predetermined lateral dimension from the centerline of the bottle to be formed to that surface of the bottle handle most distant from the centerline, i.e., upwardmost and outwardmost point 84 of mold cavity 36. Consequently, closure of mold sections 28 and 30 result in formation of handle 80 of bottle 82 by reason of confining a portion of the heat softened plastic into handle cavity 36 and by essentially isolating the adjacent excess plastic material as flash waste adjacent formed handle 80. In this embodiment, closure of mold sections 28 and 30 upon heat softened pear-shaped plastic configuration 26 creates four segments of flash, i.e., 88, 94, 96 and 106, as well as formation of the waste portion 86 at the bottom of mold sections 28 and 30 adjacent orifice 12.

Flash segment 88 is generally confined away from the plastic material forming bottle 82 in recess or depository 90 (FIGURE 4) intermediate levers 60 and 64 which provide anvil edges 91 and 92, respectively, intermediate flash segment 88 and main mold cavity 34. Closing of mold sections 28 and 30 with the bringing together of anvil edges 91 and 92 causes separation of segment 88 from the surface of container 82. Flash segment 88 remains integrally connected to the plastic material forming bottle 82 by means of a thin web passing between anvil edges 91 and 92 into main bottle forming cavity 34.

By inspection, it is noted that recess or depository 90, which essentially confines flash segment 88 into the illustrated position, is sized and dimensioned such that flash segment 88 has a considerably greater thickness than the finished thickness of bottle 82 following blow molding thereof. Because of this thickness differential, the temperature of flash segment 88 is significantly greater than the temperature of bottle 82 immediately following blow molding. Thus, there is a substantially greater transfer of heat from the thinner thickness, greater exposed surface of the plastic material forming bottle 82 to the surfaces of mold sections 28 and 30 defining the main mold cavity 34, when compared with the heat transfer from segment 88 to levers 60 and 64.

Similarly, flash segments 94 and 96 are essentially confined within recess 98 (FIGURE 4) adjacent anvil edges 100 and 102 intermediate levers 62 and 66. A thin web or hot line of plastic integrally connects segments 94 and 96 to the plastic material forming handle 80 between anvil edges 100 and 102. Waste area 106 is similarly integrally connected to the plastic material forming handle 80 and the surface of bottle 82 in between the handle and bottle surface.

Following closing of mold sections 28 and 30, causing formation of waste portion 86, waste segments 88, 94 and 96 and waste area 106, confined between handle 80 and the exterior surface of bottle 82, and following blow molding of pear-shaped configuration 26 into bottle 82 as depicted in FIGURE 3, force is applied to levers 60, 62, 64 and 66 near the distal ends of lower arms 108 causing counterclockwise rotation of levers 60 and 64 about pins 46 and 50 causing clockwise rotation of levers 62 and 66 about their pins 46 and 50 (as viewed in FIGURES 5 and 6).

Inasmuch as the rotation of levers 60, 62, 64 and 66 occurs about the respective axes of pins 46, 50, the amount of displacement of any point along upper arms 110 of levers 60 and 64 and upper arms 112 of levers 62 and 66 varies proportionally with the essential or projected radial distance at which the point is located away from the axis of rotation. Hence, the uppermost point of arms 110 and 112 are displaced a greater distance away from the surface of bottle 82 than are points located on the arms nearer the pivot axis. Because the described magnitude of displacement of arms 110 and 112 varies as the distance from the axis of rotation, and because immediately following formation of bottle 82, the temperature of flash segments 88, 94 and 96 is considerably higher than the temperature of bottle 82, rotation of levers 60, 62, 64 and 66 causes essentially a progressive tearing or trimming of segments 88, 94 and 96 along the hot line at anvil edges 91 and 92 and 100 and 102, respectively. Consequently, because of the relatively high temperature of flash segments 88, 94 and 96, and because of the progressive tearing action above-described, little difficulty and only nominal resistance are encountered in separating the flash segments from their integral connection to the surface of bottle 82 and to handle 80. Further, the mold halves completely support the article during the flash removal operation.

No special cutting equipment is required, and the trimming operation is completed while mold sections 28 and 30 remain closed, thus obviating any requirement for a secondary trimming operation subsequent to removal of bottle 82 from its mold.

Conventionally, waste portion 86, located at the bottom of mold sections 28 and 30, is removed by use of special anvil edges or cutting tools, in accordance with well established, commercial practice, for example, see United States Letters Patent No. 3,052,916. Inasmuch as removal of waste portion 86 forms no part of the present invention, and since removal thereof may be accomplished by known commercial practices, no further description of the removal of waste portion 86 will be here undertaken.

By inspection of FIGURES 2 through 6, inclusive, it is noted that, while mold sections 28 and 30 are substantially identical, they differ from each other, in that section 28 is provided with a transverse passage 120 situated adjacent flash segment 106, which is confined between handle 80 and the surface of bottle 82. The cross sectional configuration of passage 120 is essentially identical to the configuration of flash segment 106.

Section 30, on the other hand, provides aperture 122, aligned with aperture 120 of section 28, and similarly shaped in cross section. Aperture 122 houses piercing head 124 to which actuating rod 126 is rigidly fastened, as, for example, by threaded connection. Plate 128 of rod 126 passes through an aperture in face plate 130, integrally secured to section 30. The punch apparatus embodying piercing head 124 and rod 126 is biased to the position illustrated in FIGURE 4 by a spring 132.

The cross sectional configuration of piercing head 124 conforms to the cross sectional configuration of flash segment 106, permitting head 124 to sever segment 106 from bottle 82 and handle 80 by driving it into passage 120 of section 28, responsive to force applied to plate 128 of rod 126, as, for example, by means of a cylinder assembly (not shown) in timed relation with the other steps necessary to proper formation of bottle 82. Preferably, piercing head 124 is actuated at the same time as levers 60, 62, 64 and 66 are rotated.

Segment 106, also being of greater thickness than the thickness of bottle 82, is therefore of higher temperature than the temperature of the material forming bottle 82 immediately after the blow molding operation and, consequently, may be easily severed by actuation of piercing head 124.

Normally, after severing segments 88, 94, 96 and 106, the force urged against arms 108 of the levers is removed, permitting torsion spring 74 to return the levers to their article forming orientation, as depicted in FIGURES 2 through 4, inclusive. Piercing die 124 and rod 126 are also restored to their initial position.

Thereafter, mold sections 28 and 30 are opened by means of their respective cylinder assemblies, as illustrated in FIGURES 7 and 8, to accommodate easy removal of bottle 82 therefrom and, simultaneously discharging flash segments 88, 94 and 96 from recesses 90 and 98. Through repeated formation of a plurality of bottles 82, the flash segments 106 accumulate in passage 120, until that passage is full, at which time normal entry of additional segments 106 into passage 120 forces other segments 106 to be discharged from the outlet side of passage 120.

*The embodiment of FIGURES 9 through 12*

Reference is now made in detail to the second presently preferred embodiment of this invention, as illustrated in FIGURES 9 through 12, which is directed toward equipment for blow molding a bottle while at the same time compression molding the neck and mouth of the bottle from a heat softened extruded length of tubing.

The apparatus of FIGURES 9 through 12 may be part of the basic machine described in United States Letters Patent No. 2,810,934 to which reference may be made if desired.

Sequential operation leading to the manufacture of a blow molded bottle by utilization of the apparatus illustrated in FIGURES 9 through 12 is commenced by extruding a predetermined length of tubing 200 from the orifice of extruder 202 intermediate blow mold sections 204 and 206 which combine to form main mold cavity 208 when separable mold sections 204 and 206 are brought into surface-to-surface contiguous closed engagement about the tubing 200.

The insertion of blow mold nozzle 210 into the distal end of tubing 200, accompanied by closure of mold sections 204 and 206, results in compression molding of the mouth and neck of a bottle to be formed from tubing 200 in the region intermediate of the reduced diameter formed by surfaces 212 and 214 of sections 204 and 206, and the circumferential external surface of nozzle 210. The thickness of the neck 216 is less than the initial thickness of tubing 200. Consequently the compression molding of neck and mouth 216 forces heat softened plastic material out of the annulus formed intermediate surfaces 212 and 214 and the circumferential surface of nozzle 210. Flash recesses or depositories are provided between mold sections 204 and 206 to receive this excess plastic material, in a manner and for purposes subsequently to be explained.

Air or like fluid under pressure, thereafter, issues through a central passage of nozzle 210 into tubing 200, the bottom of which has been pinched closed by reason of bringing mold sections 204 and 206 together. Thus, tubing 200 is expanded to fill main mold cavity 208, thereby forming bottle 220. Structurally, mold sections 204 and 206 are constructed in a manner analogous to the construction of mold sections 28 and 30 of the embodiment depicted by FIGURES 1 through 8.

Here, as best shown in FIGURES 10, 11 and 12, apertured block supports 222 and 224 are integrally attached to the sides of mold segments 204 and 206, respectively, being centrally located thereon with respect to the vertical. Support blocks 222 non-rotatably carry elongated pins 226, while support blocks 224 non-rotatably carry support pins 228 which are slightly shorter than pins 226. Levers 230 are rotatably carried upon pins 226, while levers 232 are rotatably carried upon pins 228. When sections 204 and 206 are closed, pins 226 extend into the aligned mounting apertures in levers 232 to provide aligned rotational movement of the levers at appropriate times. Levers 230 and 232 are normally biased to the position illustrated in FIGURES 10 and 12, by means of torsion spring or like apparatus.

By inspection of FIGURE 12, it is seen that levers 230 each provide an anvil edge 236, while levers 232 each provide an anvil edge 238. Anvil edges 236 and 238 are constructed to be aligned with each other in the closed position thereby forming two recesses 240 intermediate adjacent the respective levers 230 and 232. Excess heat softened plastic material flows into the two recesses or receptacles 240, formed between the pairs of levers 230 and 232, during compression molding of the neck and mouth portion 216 of bottle 220, but remains integrally connected to neck and mouth portion 216 by a thin web or hot line of plastic material which is substantially cooled by contact with anvil edges 236 and 238. Following blow molding of bottle 220, while mold sections 204 and 206 remain in the closed position, levers 230 and 232 are rotatably actuated to pivot about the respective rotational axes provided by paired pins 226 and 228 to the position of FIGURE 11. This unitarily moves anvil edges 236 and 238 away from neck and mouth portion 216 of bottle 220 thereby progressively tearing the relatively hot flash segments 240 and 242 along the hot line established between anvils 236 and 238. Mouth waste portion 242 and tail waste portion 244 are severed from bottle 220 by established commercial practices which form no part of the present invention and, accordingly, no description thereof will here be undertaken.

The force urging levers 230 and 232 into rotation away from the article forming position is then released to accommodate restoration, by spring bias or like means, of the levers to their article forming position, as illustrated in FIGURES 10 and 12, in a manner substantially identical to the operation of the flash receiving and severing levers of the embodiment of FIGURES 1 through 8 described earlier.

Thereafter, mold sections 204 and 206 are opened by means of their respective cylinder assemblies or like means to accommodate discharge of flash segments 240 and 242, as well as removal of the finished bottle 220.

Thus, it is to be appreciated, where proper formation of plastic articles, including hollow containers of the bottle and jug variety, necessitates production of excess plastic material, better known as flash, the present invention provides for confining the excess plastic flash into appropriately sized recesses or depositories and for progressively severing or trimming the flash from the plastic article surface at a point in time when the flash is at a temperature significantly greater than the temperature of the thin web interconnecting the flash to the article and greater than the temperature of the article itself. The flash removal is achieved while the plastic article remains confined within the mold, thereby obviating any need whatsoever for secondary trimming devices and operative procedures after the plastic article is removed from the mold.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. In an apparatus for making plastic articles having means for selectively delivering a quantity of hot plastic material, the improvement comprising mold apparatus including a pair of cooperable mold sections closing on the plastic material and combining to form an article-defining cavity of desired configuration, and a relatively movable lever carried by each mold section adjacent the parting line of the section, each such lever having a recess normally located at the parting line, the recesses and the levers cooperating when the mold sections are closed to define a receptacle for receiving plastic flash pinched from the plastic material and exterior to the cavity upon closing of the mold sections, said levers having interfitting elements defining a common pivot point for the two levers when the mold sections are closed, the levers being jointly movable about said common pivot point for disconnecting the flash from the article.

2. In an apparatus for making plastic articles as defined in claim 1, the further improvement wherein each lever for disconnecting the flash waste from the article normally is biased to a flash-receiving position and joint pivotal movement of the levers about said common pivot point from said position progressively tears the flash from the article while the article is confined by said closed mold sections.

References Cited

UNITED STATES PATENTS

| 3,114,594 | 12/1963 | Sherman | 264—98 X |
| 3,141,196 | 7/1964 | Langecker | 18—5 |
| 3,145,243 | 8/1964 | Hagen | 18—5 |
| 3,295,159 | 1/1967 | Fischer | 18—5 |

FOREIGN PATENTS

| 752,637 | 7/1956 | Great Britain. |
| 1,331,080 | 5/1963 | France. |
| 1,178,580 | 9/1964 | Germany. |
| 221,038 | 3/1958 | Australia. |

WILBUR L. McBAY, *Primary Examiner.*

ROBERT F. WHITE, *Examiner.*

R. B. MOFFITT, *Assistant Examiner.*